United States Patent [19]

Hirano et al.

[11] Patent Number: 4,735,387
[45] Date of Patent: Apr. 5, 1988

[54] BAND WITH BUCKLE

[75] Inventors: Seiji Hirano; Youji Sato, both of Hiroshima, Japan

[73] Assignees: Mazda Motor Corporation, Hiroshima; Nifco Inc., Yokohama, both of Japan

[21] Appl. No.: 853,847

[22] Filed: Apr. 18, 1986

[30] Foreign Application Priority Data

Apr. 26, 1985 [JP] Japan .............................. 60-61915[U]

[51] Int. Cl.$^4$ .............................................. B65D 63/00
[52] U.S. Cl. ...................................... 248/71; 248/74.3; 24/16 PB
[58] Field of Search ............... 248/71, 73, 74.3; 24/16 PB, 30.5 P, 16 R

[56] References Cited

U.S. PATENT DOCUMENTS

| Re. 31,689 | 10/1984 | Bulanda | 24/16 PB |
|---|---|---|---|
| 3,590,442 | 7/1971 | Geisinger | 24/16 PB |
| 3,605,199 | 9/1971 | Eberhardt | 24/16 PB |
| 3,731,347 | 5/1973 | Caveney | 24/16 PB |
| 3,887,965 | 6/1975 | Schuplin | 248/74.3 |
| 4,137,606 | 2/1979 | Wood | 24/16 PB |
| 4,490,886 | 1/1985 | Omata | 248/74.3 |
| 4,564,163 | 1/1986 | Barnett | 248/71 |
| 4,573,242 | 3/1986 | Lankton | 24/16 PB |

Primary Examiner—J. Franklin Foss
Assistant Examiner—Robert A. Olson
Attorney, Agent, or Firm—Trexler, Bushnell, Giangiorgi & Blackstone, Ltd.

[57] ABSTRACT

A band for binding articles comprises a band body having a plurality of ridges provided in a row at a fixed pitch and a buckle integral with one end of the band body and having an insertion hole and a plurality of elastic locking members extending through the insertion hole and provided with respective locking pawls staggered with respect to one another. When the band body is inserted through the insertion hole of the buckle, the locking ridges of the band body are locked to one of the elastic locking members in the buckle. It is thus possible to fine-adjust the locking state of the band body.

5 Claims, 2 Drawing Sheets

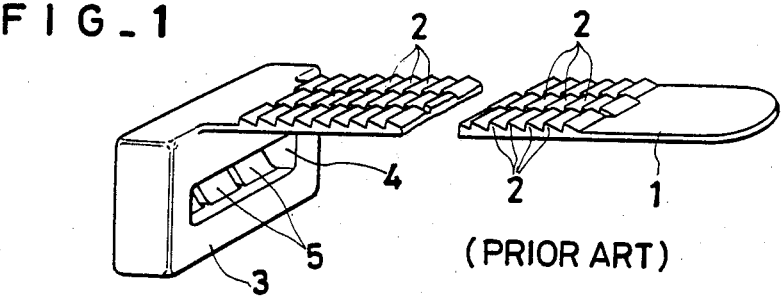
FIG_1 (PRIOR ART)
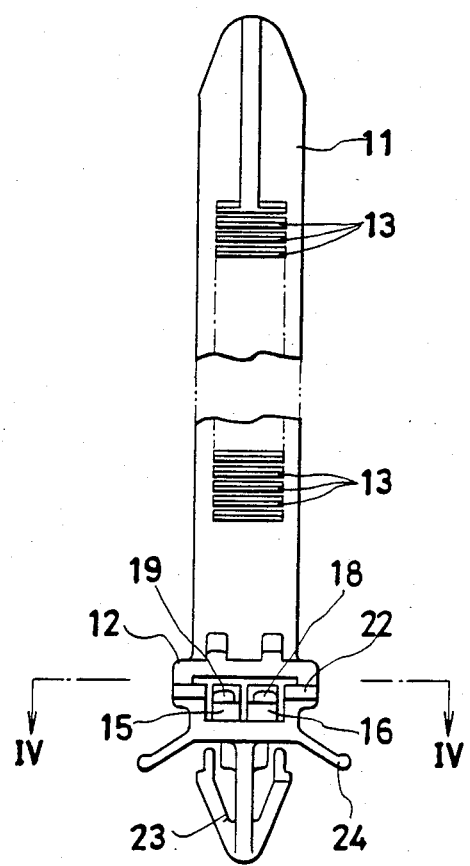
FIG_2
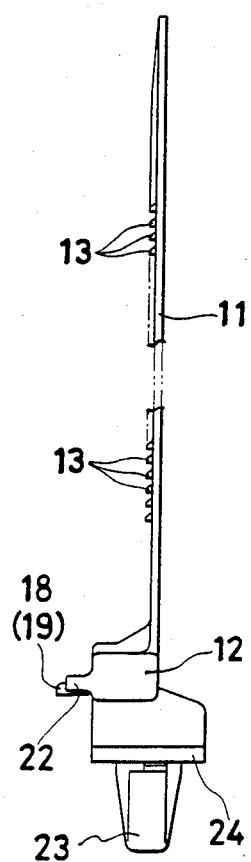
FIG_3

FIG_5
FIG_4
FIG_6
FIG_7
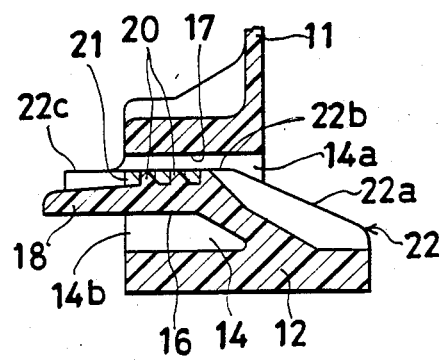
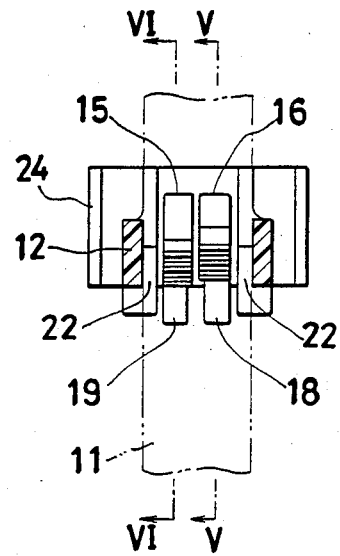
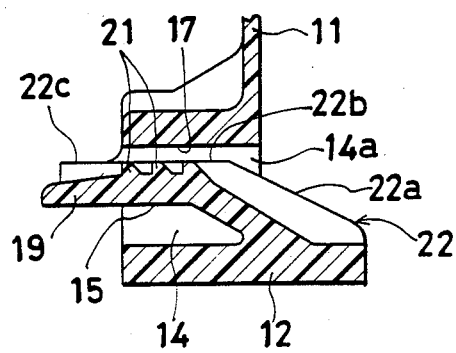
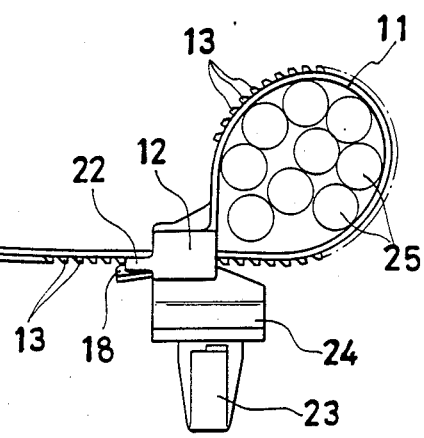

BAND WITH BUCKLE

FIELD OF THE INVENTION AND RELATED ART STATEMENT

This invention relates to a band with a buckle, which is used for binding together electric cables and tubes in a vehicle, or other objects such as rods, or for attaching a bundle of electric cables or the like to a suitable stationary place.

Bands for bundling electric cables are used extensively for binding together wiring cables in vehicles and electric apparatus.

Prior art bands of this type often comprise a band body and a buckle as separate parts. However, in many bands for binding together electric cables, the band body and buckle are integral with each other. In use, after winding the band body round a group of objects to be bound together, one end of it is passed through an insertion hole of the buckle provided at the other end and hooked on a locking pawl provided inside the insertion hole to hold the band in a binding state.

To lock the band, one surface of the strip-like band body is formed with a plurality of alternate hills and valleys arranged in a row in the longitudinal direction, and these hills and valleys are progressively fed with respect to the locking pawl. When the band body is tightly wound round the group of articles to be bound together, the locking pawl is hooked in a corresponding valley between adjacent hills. The tightness or looseness of this binding is automatically determined at an interval corresponding to the pitch of the hills and valleys.

The proper tightness or looseness of this binding varies with the objects to be bound together. In case where it is required to bind together articles to obtain a state free from rattling and also where the articles to be bound together lack elastic property, the pitch of the locking sections provided on the band body is desirably as small as possible.

However, the band of this kind is usually molded from a synthetic resin. Therefore, there is a lower limit on the pitch of the locking sections for increasing the tightness of binding.

To overcome this drawback, a band as shown in FIG. 1 has been proposed. (Japanese utility model application Public Disclosure No. SHO 54(1979)-149592). In this band, one surface of the band body 1 is provided with a plurality (three in Figure) of parallel rows of locking ridges 2, with the locking ridges in one of these rows staggered with respect to the locking ridges in the other two rows. The band body is provided at one end with an integral buckle 3 having an insertion hole 4. In the insertion hole 4, a plurality of locking pawls 5 are provided in a lateral row such that they can co-operate with the row of locking ridges 2. When locking the band, one of these locking pawls is locked in a valley between adjacent locking ridges 2 in the corresponding row. Thus, it is possible to obtain the same effects in the case where a plurality of locking pawls are provided for one pitch of the arrangement of the locking ridges.

With this prior art band, the effective locking pitch can be varied without varying the size of each of the locking ridges provided in the longitudinal direction of the band. Thus, it is possible to obtain a band which has high mechanical strength.

However, with the prior art band, in which the band body is provided with a plurality of rows of locking ridges, when the width of the band is reduced, the width of the locking ridges in each row is also reduced to reduce the locking force. In addition, there is a possibility that the locking pawl of the buckle will interfere with locking ridges in other rows. Therefore, there is a lower limit on the width of the locking ridges.

OBJECT AND SUMMARY OF THE INVENTION

This invention has been made in view of the above deficiencies inherent in the prior art band. Its object is to provide a band in which the band body is provided with locking ridges having a size which permits sufficient mechanical strength to be obtained to lock a locking pawl of the buckle when binding together articles, and which also can bind together articles with an adjustment interval smaller than the pitch of locking ridges provided on the band body. Further, the invention seeks to provide a band which after one use to bind objects can be released for re-use.

To attain the above object of the invention, there is provided a band which comprises a strip-like band body and a buckle integral with one end of the band body, the band body having a plurality of locking ridges formed on one surface, the ridges extending at right angles to the longitudinal direction of the band body and being arranged in a row at a fixed pitch, the buckle having an insertion hole and a plurality of elastic locking members extending through the insertion hole from an inlet side thereof to an outlet side thereof, the elastic locking members being integral with the side wall of the insertion hole, the plurality of elastic locking members being provided with respective locking pawls staggered with respect to one another in the direction of insertion through the insertion hole.

This band is characterized in that a row of locking ridges provided on a band body are commonly co-operative with a plurality of locking members with respective looking pawls provided in a buckle. More specifically, when the band body is wound about a group of articles and its end is passed through the insertion hole of the buckle to bind the articles together, the band body is locked to either one of the elastic locking members with respective locking pawls, the locking pawls of one of these locking members being staggered in the direction of insertion with respect to the locking pawls of the other locking members. For instance, two elastic locking members with respective locking pawls are provided with the locking pawls of one of these locking members staggered by an amount corresponding to one half the pitch of the locking ridges with respect to the locking pawls of the other locking member. In this case, articles can be bound together in increments of tightness corresponding to one half the pitch of the locking pawls.

Further, with the band according to this invention end portions extending from the individual elastic locking members constitute operating pieces extending out of the buckle. Further, a guide for guiding the band body is provided on each side wall of the insertion hole and extends parallel to the operating pieces. The band is released from the locked state by operating the operating pieces, while the operating pieces are prevented from being operated by the flexing of the band body.

BRIEF DESCRIPTION OF THE DRAWINGS

The other objects and characteristics features of the present invention will become apparent to those skilled in the art as the disclosure is made in the following description of a preferred embodiment of the invention, as illustrated in the accompanying drawings:

FIG. 1 is a perspective view, partly broken away, showing a prior art band;

FIG. 2 is a front view, partly broken away, showing an embodiment of the band with buckle according to the invention;

FIG. 3 is a side view, partly broken away, showing the same band;

FIG. 4 is a sectional view taken along line IV—IV in FIG. 2;

FIG. 5 is a fragmentary enlarged-scale sectional view taken along line V—V in FIG. 4;

FIG. 6 is a fragmentary enlarged-scale sectional view taken along line VI—VI in FIG. 4; and FIG. 7 is a side view showing the same band in use.

DETAILED DESCRIPTION OF THE PREFERRED EMBODIMENT

The invention will now be described in conjunction with an embodiment thereof shown in FIGS. 2 to 7. Referring to the Figures, reference numeral 11 designates a strip-like band body, and numeral 12 a buckle which is integral with one end of the band body.

The band body 11 has a plurality of locking ridges 13 which are formed on one surface. The locking ridges 13 extend at right angles to the longitudinal direction of the band body and are arranged in a row at a fixed pitch.

The locking ridges 13 are arranged such that they have a sectional profile like a sawtooth with the top inclined toward the buckle. They each have a sufficient mechanical strength to hook locking pawls 20, 21 to be described later. Adjacent ridges 13 are sufficiently spaced apart to hook the locking pawls between them.

The buckle 12, which is integral with one end of the band body 11, is substantially cylindrical in shape, and has an insertion hole 14. Two parallel elastic locking members 15, 16 are provided in the insertion hole 14. The locking members 15, 16 extend through the insertion hole 14 from an inlet 14a thereof, and their other end portions project from an outlet 14b.

The respective elastic locking members 15, 16 extend obliquely from the side wall of the insertion hole 14 toward the center thereof, and then have portions extending parallel to and spaced apart from the respective side walls 17 defining the insertion hole 14. Their end portions projecting from the insertion hole 14 serve as operating pieces 18, 19. The locking pawls 20, 21 are formed on the surface of the elastic locking members 15, 16, respectively.

The locking pawls 20, 21 of the elastic locking members 15, 16 are staggered in phase relative to one another in the direction of insertion through the insertion hole 14 by an amount corresponding to one half of the pitch of the locking ridges 13 of the band body 11. In this embodiment, each elastic locking member 15 (16) has three locking pawls 20 (21) which are arranged at the same pitch as the locking ridges 13. These locking pawls 20 (21) are adapted to engage the locking ridges 13.

The insertion hole 14 has a width slightly greater than the width of the band body 11 to permit smooth insertion of the band body. The buckle 12 is provided with a guide 22 provided on each side wall to extend from a position ahead of the inlet to a position behind the outlet, so that the band body 11 is guided as it is inserted through the insertion hole 14.

The guide 22 has an inclined surface 22a extending up to the neighborhood of the inlet 14a of the insertion hole 14. The inclined surface 22a terminates in a surface 22b. The surface 22b extends parallel to a side wall 17 facing the locking members 15, 16, and is spaced apart from the side wall 17 by a distance slightly greater than the thickness of the band body 11. The parallel surface 22b projects from the outlet 14b, and the projecting portion 22c extends parallel to the operating pieces 18, 19.

Since the band body 11 is moved in frictional contact with the guide 22, the locking ridges 13 are provided on a laterally central portion of the band body, and opposite edge portions thereof have a smooth surface.

In the Figures, reference numeral 23 designates a conical locking leg depending from the underside of the buckle 12, and numeral 24 denotes spring portions also extending from the underside of the buckle 12 on the opposite sides of the locking leg.

The band having the above construction according to the invention is molded from a synthetic resin having adequate rigidity and elasticity, e.g., polypropylene resin.

This band, like the prior art band, may be used to bundle electric cables, for instance. More particularly, the band body 11 is wound around a group of cables 25. Then, its end is passed through the insertion hole 14 of the buckle 12 from the inlet 14a. At this time, the locking ridges 13 provided on one surface move over the elastic locking members 15, 16 with a clicking sound. By pulling the end of the band body pushed out from the outlet 14b the cables 25 are squeezed and bound together.

Also at this time, the end portions of the elastic locking members 15, 16 bearing the respective locking pawls 20, 21 are flexed to permit passage of the locking ridges 13. When the end of the band body is released after the cables have been bound together, the binding state of the band body is maintained with the locking pawls 20, 21 of one of the two elastic locking members 15, 16 engaged in valleys between adjacent locking ridges 13. Since the locking pawls 20, 21 of the two elastic locking members are staggered with respect to one another by an amount corresponding to one half the pitch of the locking ridges 13, when the locking pawls of one of the two locking members are engaged in valleys between adjacent locking ridges, the locking pawls of the other elastic locking member engage with the top of the ridges and are downwardly flexed. This occurs alternately with the locking pawls of the two elastic locking members as the band body is moved thereover.

The band body in the binding state as described above can be released from the locked state by depressing the operating pieces 18, 19 constituted by the free end portions of the elastic locking members. At this time, the two operating pieces 18, 19 have to be depressed together for releasing the band body. This can be readily done since the two operating pieces extend side by side.

As has been shown above, with the band according to the invention the binding state can be obtained by merely passing the end of the band body 11 through the insertion hole 14 of the buckle 12. At this time, a plurality of elastic locking members provided within the insertion hole simultaneously engage with the band body, and one or the other of them is locked to the locking ridges 13, so that the binding state can be immediately obtained.

The locking pawls 20, 21 provided on the elastic locking members according to the invention are staggered with respect to one another by an amount within the pitch of the locking ridges 13 of the band body (one half the pitch in the above embodiment). Thus, it is possible to select the locking position at increments of less than the distance between adjacent locking ridges 13. The binding force on the cables can thus be adjusted more finely and the cables can be bound together more closely.

This is particularly effective when binding together materials which are not plastic. Reduction of the pitch of the locking ridges 13 and corresponding reduction of the staggered amount of the locking pawls 20, 21 can adjust the binding force more finely. Further, the more the number of the locking members, the finer the adjustment of the binding force. However, since the pitch of the locking pawls on any one of the locking members is substantially the same as the pitch of the locking ridges on the band body, the locking ridges and locking pawls may be of sizes and shapes which provide sufficient mechanical strength. Thus, it is possible to produce a small sized band which can ensure reliable binding.

Further, according to the invention the elastic locking members can be released by operating the operating pieces, and at this time the end of the band body projecting from the outlet of the insertion hole of the buckle is guided by the guide 22 provided on each side wall of the insertion hole and is thus prevented from being flexed toward the operating pieces. Therefore, even if the end of the band body is occasionally touched by the hand or any nearby part, the locked state is not released. Thus, it is possible to provide a highly reliable band.

In the above embodiment the buckle is provided with two elastic locking members. However, it is possible to provide three or more elastic locking members. In this case, if the reduced width of the individual locking members resulting from the increase in their number is liable to reduce the mechanical strength of the locking pawls, each locking member may be provided with a plurality of locking pawls in a row at the same pitch as that of the locking ridges of the band body as described before in conjunction with the above embodiment.

What is claimed is:

1. A band comprising a strip-like band body and a buckle integral with one end of said band body, said band body having a plurality of locking ridges formed on one surface, said ridges extending at right angles to the longitudinal direction of said band body and arranged in a row at a fixed pitch, said buckle having an insertion hole and a plurality of laterally spaced elastic locking members extending through said insertion hole from an inlet side thereof to an outlet side thereof, said elastic locking members being integral with the side wall of said insertion hole, said plurality of elastic locking members each being provided with a plurality of locking pawls, the locking pawls on the respective locking members being staggered with respect to one another in the direction of insertion through said insertion hole by an amount corresponding to one half the pitch of said locking ridges, whereby said pawls on the respective locking members respectively alternately engage said ridges and rest at intermediate positions on said ridges for fine adjustment of said body in said buckle.

2. The band according to claim 1, which further comprises a guide provided on each side wall of said insertion hole of said buckle for guiding said band body.

3. The band according to claim 1, which further comprises a locking leg depending from the underside of said buckle.

4. The band according to claim 3, which further comprises a pair of spring members extending from said buckle underside on the opposite sides of said locking leg.

5. The band according to claim 1, wherein said elastic locking members have respective extensions serving as operating pieces.

* * * * *